US012499807B2

(12) United States Patent
Li et al.

(10) Patent No.: US 12,499,807 B2
(45) Date of Patent: Dec. 16, 2025

(54) DISPLAY PANEL AND DRIVING METHOD THEREFOR, AND DISPLAY DEVICE

(71) Applicants: Wuhan BOE Optoelectronics Technology Co., Ltd., Wuhan (CN); BOE TECHNOLOGY GROUP CO., LTD., Beijing (CN)

(72) Inventors: Bing Li, Beijing (CN); Lijun Xiao, Beijing (CN); Junmin Zhang, Beijing (CN); Ziming Yang, Beijing (CN); Meng Feng, Beijing (CN); Mengchao Shuai, Beijing (CN); Jianmin Xiang, Beijing (CN); Feng Jiang, Beijing (CN); Bensheng Song, Beijing (CN); Hangyu Chen, Beijing (CN); Yun Bai, Beijing (CN); Kai Cheng, Beijing (CN)

(73) Assignees: WUHAN BOE OPTOELECTRONICS TECHNOLOGY CO., LTD., Hubei (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/644,650

(22) Filed: Apr. 24, 2024

(65) Prior Publication Data

US 2024/0290243 A1 Aug. 29, 2024

Related U.S. Application Data

(63) Continuation of application No. PCT/CN2023/078838, filed on Feb. 28, 2023.

(51) Int. Cl.

*G09G 3/20* (2006.01)
*G09G 5/391* (2006.01)

(52) U.S. Cl.

CPC ........... *G09G 3/2092* (2013.01); *G09G 5/391* (2013.01); *G09G 2310/0286* (2013.01);

(Continued)

(58) Field of Classification Search

CPC ................. G09G 3/2092; G09G 5/391; G09G 2310/0286; G09G 2310/0291; G09G 2340/0407; G09G 2370/00; G09G 3/20

See application file for complete search history.

(56) References Cited

U.S. PATENT DOCUMENTS

| | | | | |
|---|---|---|---|---|
| 6,456,271 B1 * | 9/2002 | Tamai | G09G 3/2011 | 345/94 |
| 7,764,255 B2 * | 7/2010 | Yen | G09G 3/3688 | 348/800 |

(Continued)

FOREIGN PATENT DOCUMENTS

| | | |
|---|---|---|
| CN | 107918533 A | 4/2018 |
| CN | 110379389 A | 10/2019 |

(Continued)

OTHER PUBLICATIONS

International Search Report and Written Opinion mailed on Jul. 24, 2023, in corresponding PCT/CN2023/078838, 13 pages.

*Primary Examiner* — Jose R Soto Lopez
(74) *Attorney, Agent, or Firm* — XSENSUS LLP

(57) ABSTRACT

A display panel, including a drive circuit, where the drive circuit is at least used to drive the display panel to display obtained display data. The drive circuit includes a shift register, a data buffer and a first control circuit; the shift register is used to output display data of each sub-pixel according to a preset timing sequence; the data buffer at least includes a first cache module composed of N repeat units; a repeat unit includes at least one cache unit, the cache unit is connected to the shift register, and two cache units at a same position in the k-th repeat unit and the (k+1)-th repeat unit (Continued)

are multiplexed with a same clock signal terminal; the cache unit is used to be turned on in response to an output signal from the clock signal terminal connected to the cache unit, to cache the received display data.

19 Claims, 11 Drawing Sheets

(52) U.S. Cl.
CPC ............... *G09G 2310/0291* (2013.01); *G09G 2340/0407* (2013.01); *G09G 2370/00* (2013.01)

(56) References Cited

U.S. PATENT DOCUMENTS

| | | | | |
|---|---|---|---|---|
| 8,174,514 | B2 * | 5/2012 | Kim | G09G 3/3291 345/55 |
| 8,416,176 | B2 * | 4/2013 | Lee | G09G 3/3688 345/94 |
| 2005/0253803 | A1 * | 11/2005 | Thompson | G09G 3/3453 345/107 |
| 2006/0097974 | A1 * | 5/2006 | Hashimoto | G09G 3/3607 345/98 |
| 2006/0176256 | A1 * | 8/2006 | Yen | G09G 3/3688 345/88 |
| 2006/0227638 | A1 * | 10/2006 | Kudo | G09G 3/3688 365/203 |
| 2009/0207192 | A1 * | 8/2009 | Hashimoto | G09G 3/3688 345/88 |
| 2010/0002021 | A1 * | 1/2010 | Hashimoto | G09G 3/2003 345/88 |
| 2011/0181570 | A1 * | 7/2011 | Minami | G09G 3/3688 345/209 |
| 2012/0293536 | A1 * | 11/2012 | Yonemaru | G09G 3/3648 345/589 |
| 2015/0130782 | A1 * | 5/2015 | Amino | G09G 3/20 345/213 |
| 2018/0366052 | A1 * | 12/2018 | Shi | G09G 3/3275 |
| 2020/0135116 | A1 * | 4/2020 | Qian | G09G 3/3258 |
| 2022/0208874 | A1 * | 6/2022 | Zhang | H10K 59/121 |
| 2022/0366842 | A1 * | 11/2022 | Kwon | G09G 3/3208 |
| 2022/0406246 | A1 * | 12/2022 | Lee | G09G 3/32 |
| 2023/0164386 | A1 * | 5/2023 | Zhu | H04N 21/440263 382/248 |
| 2023/0186830 | A1 * | 6/2023 | Ha | G09G 3/32 345/55 |
| 2023/0206803 | A1 * | 6/2023 | Kim | G09G 3/20 345/691 |

FOREIGN PATENT DOCUMENTS

| | | | |
|---|---|---|---|
| CN | 113096579 | A | 7/2021 |
| CN | 114187859 | A | 3/2022 |
| CN | 114495798 | A | 5/2022 |
| CN | 115088247 | A | 9/2022 |
| CN | 115171586 | A | 10/2022 |
| TW | I698848 | B | 7/2020 |

* cited by examiner

DISPLAY PANEL AND DRIVING METHOD THEREFOR, AND DISPLAY DEVICE

CROSS-REFERENCE TO RELATED APPLICATION

The present application is a U.S. Continuation application of International Application No. PCT/CN2023/078838, filed on Feb. 28, 2023, the contents of which are incorporated herein by reference in its entirety for all purposes.

TECHNICAL FIELD

The present disclosure relates to the field of display technology, and in particular, to a display panel and driving method therefor, and a display device.

BACKGROUND

Currently, the resolution of the drive circuit in the display panel is in one to one correspondence with the resolution of the display screen completely. For example, in the drawing below, for a current product of 8K 60 Hz, OC is of 24 COFs (Chip on Film), and the drive board is an 8K Tcon chip driven by IC, and the signal source is an 8K SOC chip.

It should be noted that the information disclosed in the above background part is only used to enhance understanding of the background of the present disclosure, and therefore may include information that does not constitute the related art known to those of ordinary skills in the art.

SUMMARY

According to an aspect of the present disclosure, there is provided a display panel including a drive circuit, and the drive circuit is at least used to drive the display panel to display obtained display data; the drive circuit includes: a shift register, used to output display data of each sub-pixel according to a preset timing sequence; a data buffer, at least including a first cache module, where the first cache module includes N repeat units, and a repeat unit includes at least one cache unit; the cache unit is connected to the shift register; two cache units at a same position in a k-th repeat unit and a (k+1)-th repeat unit are multiplexed with a same clock signal terminal; the cache unit is used to be turned on in response to an output signal from the clock signal terminal connected to the cache unit, to cache received display data; N is a positive integer greater than or equal to 2; and k is an odd number; and a first control circuit, including a plurality of first control units, where a first control unit is connected between a clock signal terminal and a cache unit in the (k+1)-th repeat unit connected to the clock signal terminal; the first control unit is used to be turned on when an enable signal terminal connected to the first control unit outputs a first control signal, to copy display data corresponding to a cache unit in the k-th repeat unit to a cache unit at a corresponding position in the (k+1)-th repeat unit.

In some embodiments of the present disclosure, the cache unit in the (k+1)-th repeat unit is multiplexed with a clock signal terminal corresponding to the cache unit at a same position in the k-th repeat unit.

In some embodiments of the present disclosure, an input terminal of the shift register is connected to a data output terminal of a drive board, a data input terminal of the drive board is connected to a signal source terminal, and display data output from the signal source terminal is output to the shift register through the drive board, where a resolution of the display panel is four times of a resolution of the drive board and of a resolution of the signal source terminal.

In some embodiments of the present disclosure, a cache unit stores display data of a sub-pixel; the display panel includes a plurality of pixel units distributed in an array with a row direction and a column direction, a pixel unit includes at least one sub-pixel, and a number of sub-pixels in the pixel unit is correspondingly the same as a number of cache units in the repeat unit.

In some embodiments of the present disclosure, the pixel unit includes a first sub-pixel, a second sub-pixel and a third sub-pixel; the first sub-pixel, the second sub-pixel and the third sub-pixel are distributed alternately and sequentially along the row direction; where, the repeat unit is in one to one correspondence with the pixel unit; and the repeat unit includes a first cache unit, a second cache unit and a third cache unit; the first cache unit is used to store display data corresponding to the first sub-pixel, the second cache unit is used to store display data corresponding to the second sub-pixel, and the third cache unit is used to store display data corresponding to the third sub-pixel; and a first control unit is connected in series between a first cache unit in the k-th repeat unit and a first cache unit in the (k+1)-th repeat unit; a first control unit is connected in series between a second cache unit in the k-th repeat unit and a second cache unit in the (k+1)-th repeat unit, and a first control unit is connected in series between a third cache unit in the k-th repeat unit and a second cache unit in the (k+1)-th repeat unit.

In some embodiments of the present disclosure, the cache unit includes a plurality of cache sub-units, and a number of cache sub-units in a same cache unit is the same as a number of data bits included in display data of a sub-pixel.

In some embodiments of the present disclosure, the first control unit includes a first transmission gate connected to the enable signal terminal and two cache units at the same position in the k-th repeat unit and the (k+1)-th repeat unit; where the first transmission gate is used to transmit display data stored in the cache unit in the k-th repeat unit to a corresponding cache unit in the (k+1)-th repeat unit in response to the first control signal output from the enable signal terminal.

In some embodiments of the present disclosure, the drive circuit further includes a second control circuit including m second control units; a second control unit is connected in series between the cache unit in the (k+1)-th repeat unit and the clock signal terminal corresponding to the cache unit in the (k+1)-th repeat unit; the second control unit is used to be turned off when the enable signal terminal outputs the first control signal, or to be turned on when the enable signal terminal outputs a second control signal; and the first control signal has an opposite polarity to the second control signal.

In some embodiments of the present disclosure, the second control unit includes a second transmission gate connected to the cache unit in the (k+1)-th repeat unit and the clock signal terminal corresponding to the cache unit in the (k+1)-th repeat unit; the second transmission gate is used to be turned off in response to the first control signal output from the enable signal terminal, or to be turned on in response to the second control signal output from the enable signal terminal.

In some embodiments of the present disclosure, the drive circuit further includes a clock circuit including a plurality of cascaded shift output units; a shift output unit is provided with the clock signal terminal, and the shift output unit is used to output a clock signal through the clock signal terminal; where, an output terminal of an (e×n)-th shift output unit is cascaded to an input terminal of an (e×n+1)-th shift output unit through a second transmission gate, and is cascaded to an input terminal of an (e×n+(e+1))-th shift output unit through a first transmission gate; an output terminal of an (e×n+e)-th shift output unit is cascaded to the input terminal of the (e×n+(e+1))-th shift output unit through another second transmission gate; and e is a number of sub-pixels included in the pixel unit in the display panel, n is an odd number, and a turn-on level of the second transmission gate has an opposite polarity to a turn-on level of the first transmission gate.

In some embodiments of the present disclosure, the data buffer further includes a second cache module; the second cache module includes a plurality of storage units, a storage unit is connected to each cache unit in the first cache module in one to one correspondence, and the storage unit is used to output display data stored in the cache unit to a data line connected to the storage module.

In some embodiments of the present disclosure, the display panel includes: a drive circuit, used to sequentially receive row data to be displayed, and apply received x-th row data to be displayed to a (2x−1)-th row of sub-pixels and a 2x-th row of sub-pixels respectively; and a gate drive circuit, used to control the (2x−1)-th row of sub-pixels to be charged for 1H and the 2x-th row of sub-pixels to be charged for 2H; x is a natural number greater than or equal to 1 and less than N, and N is a total number of pixel rows in the display panel.

In some embodiments of the present disclosure, the display panel includes: a drive circuit, used to sequentially receive row data to be displayed, and apply received x-th row data to be displayed to a (2x−1)-th row of sub-pixels and a 2x-th row of sub-pixels respectively; and a gate drive circuit, used to control the (2x−1)-th row of sub-pixels and the 2x-th row of sub-pixels both to be charged for 2H; x is a natural number greater than or equal to 1 and less than N, and N is a total number of pixel rows in the display panel.

According to a second aspect of the present disclosure, there is further provided a driving method for a display panel, used to drive the display panel according to any embodiment of the present disclosure. The method includes: obtaining the first control signal output from the enable signal terminal, where the first control signal is used to control the first control unit to be turned on; obtaining the display data output from the signal source terminal, converting an obtained serial data signal into a parallel signal through the shift register, and then outputting the parallel signal; and obtaining a clock signal output from the clock signal terminal, and caching received display data through the cache unit in response to the clock signal output from the clock signal terminal connected to the cache unit; where the display data of the cache unit corresponding to the k-th repeat unit in the data buffer is copied to the cache unit at the corresponding position in the (k+1)-th repeat unit through the first control unit, and k is an odd number.

In some embodiments of the present disclosure, the method including: receiving the row data to be displayed, sequentially; and applying the received x-th row data to be displayed to the (2x−1)-th row of sub-pixels and the 2x-th row of sub-pixels respectively; a charging duration of the (2x−1)-th row of sub-pixels is 1H, and a charging duration of the 2x-th row of sub-pixels l is 2H; where, x is a natural number greater than or equal to 1 and less than N, and N is a total number of pixel rows in the display panel.

In some embodiments of the present disclosure, the method including: receiving the row data to be displayed, sequentially; and applying the received x-th row data to be displayed to the (2x−1)-th row of sub-pixels and the 2x-th row of sub-pixels respectively; a charging duration of the (2x−1)-th row of sub-pixels and a charging duration of the 2x-th row of sub-pixels are both 2H; where, x is a natural number greater than or equal to 1 and less than N, and N is a total number of pixel rows in the display panel.

According to a third aspect of the present disclosure, there is further provided a display device, including: the display panel according to any embodiment of the present disclosure; a drive board, connected to the display panel, where the drive board includes a Tcon chip, and the Tcon chip is used to output obtained display data to the display panel; and a signal source terminal, including an SOC chip, where the SOC chip is connected to the Tcon chip, and the SOC chip is used to output the display data to the Tcon chip.

In some embodiments of the present disclosure, each of a resolution of the SOC chip and a resolution of the Tcon chip is ¼ of a resolution of the display panel; or, the resolution of the SOC chip is ¼ of the resolution of the display panel, and the resolution of the Tcon chip is the same as the resolution of the display panel.

In the display panel provided by the present disclosure, the drive circuit includes a first control circuit, and the first control circuit includes a plurality of first control units. When the enable signal terminal outputs a first control signal, the first control unit is turned on, which can copy the display data of the cache unit in the k-th repeat unit to the cache unit at a corresponding position in the (k+1)-th repeat unit, so that the same display data is written into two cache units at the same position in the k-th repeat unit and the (k+1)-th repeat unit. In this way, in conjunction with the timing sequence control at the clock signal terminal, the received low-resolution display data can be written into the high-resolution panel fully, that is, the low-resolution signal source terminal can be used to drive the high-resolution panel.

It should be understood that the foregoing general description and the following detailed description are exemplary and explanatory only, and do not limit the present disclosure.

BRIEF DESCRIPTION OF THE DRAWINGS

The accompanying drawings, which are incorporated in and constitute a part of the description, illustrate embodiments consistent with the disclosure and together with the description serve to explain the principles of the disclosure. Obviously, the drawings in the following description are some embodiments of the present disclosure, and for those of ordinary skills in the art, other drawings can also be obtained from these drawings without creative efforts.

DETAILED DESCRIPTION

Figure 1:
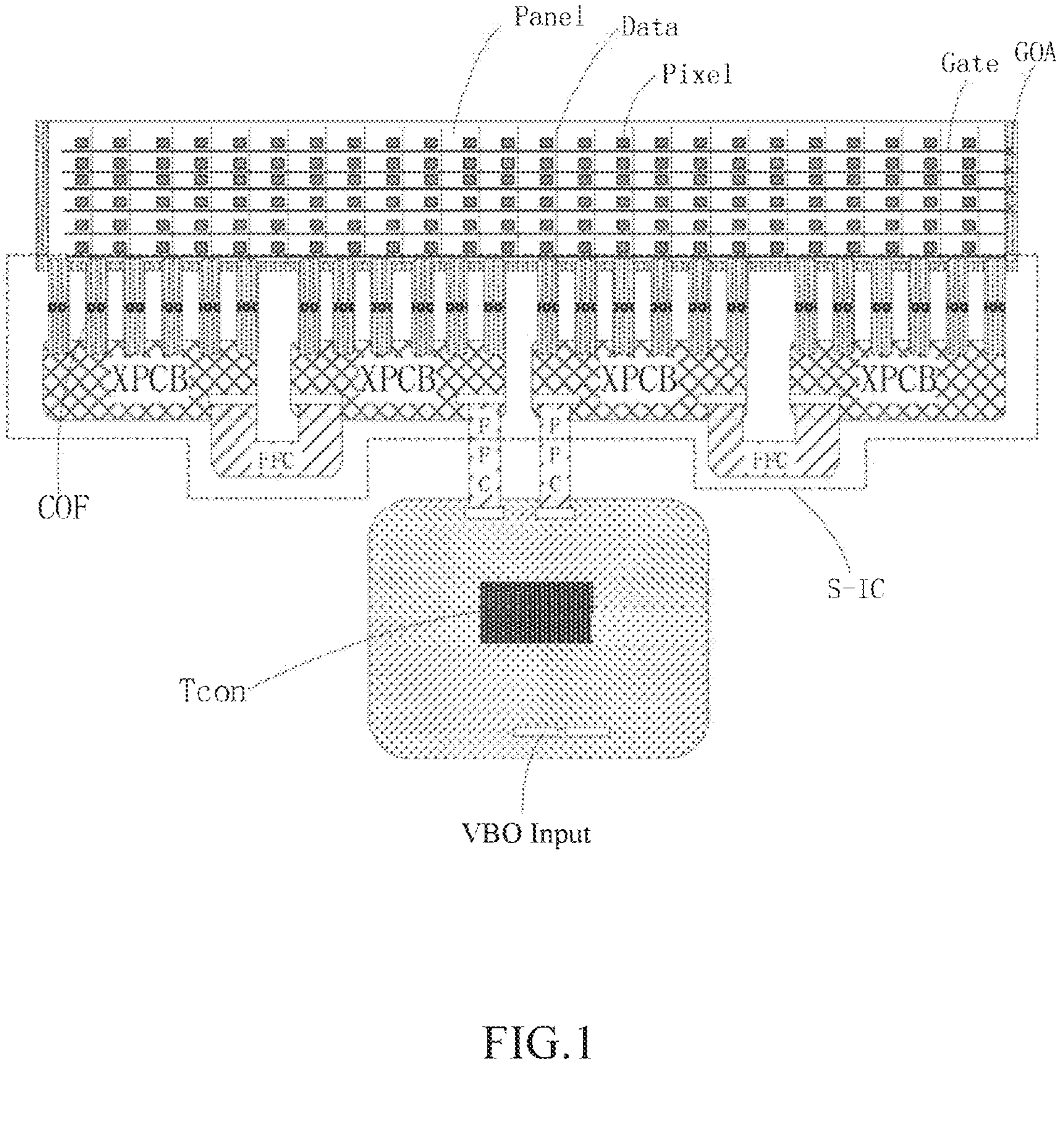
FIG. 1 is a schematic structural diagram of a display device according to some embodiments of the present disclosure.

Example embodiments will now be described more fully with reference to the accompanying drawings. Example embodiments, however, can be implemented in various forms and should not be construed as limited to the embodiments set forth here; by contrast, these embodiments are provided so that the present disclosure will be thorough and complete, and will fully convey the concept of example embodiments to those skilled in the art. The same reference numerals in the drawings denote the same or similar structures, and thus their detailed descriptions will be omitted. Furthermore, the drawings are merely schematic illustrations of the present disclosure and are not necessarily drawn to scale.

Usually, the resolution of the drive circuit in the display panel is in one to one correspondence with the resolution of the display screen completely. In the related art, some customers want to use a VBO signal source of a 4K SOC to drive an 8K resolution display panel (with 24 COFs and an 8K Tcon board). Currently, in some 8K Tcon boards, input of 4K VBO signal sources can be realized. That is, data expansion is performed by the 8K Tcon board, and 8K P2P signals are finally output to 24 COFs, where a low-resolution chip at the signal source terminal is used to drive a high-resolution display panel. The currently actual situation is that the cost of an 8K Tcon board is more than five times of the cost of a 4K Tcon board. There is a problem of excessive usage cost in this solution. To solve this problem, the present disclosure provides a panel drive circuit with a new architecture.

Figure 2:
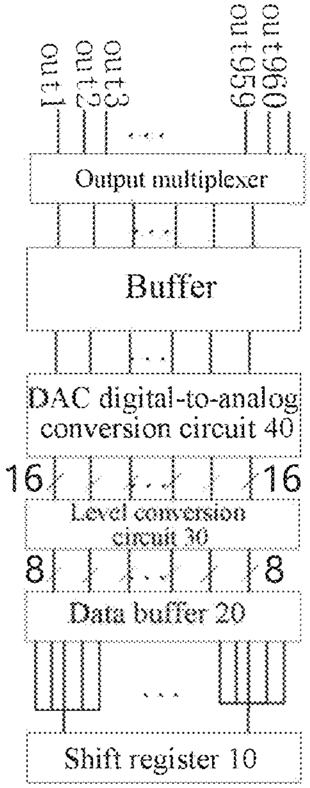
FIG. 2 is a schematic structural diagram of a drive circuit in FIG. 1.
Figure 3:
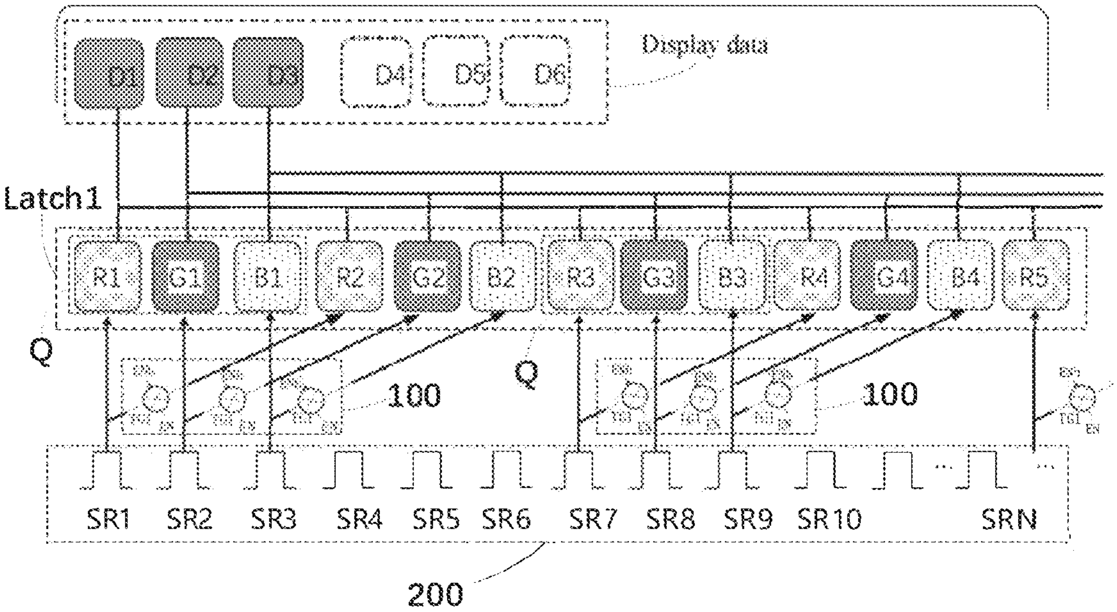
FIG. 3 is a schematic structural diagram of a part of circuit in FIG. 2.

FIG. 1 is a schematic structural diagram of a display device according to some embodiments of the present disclosure. FIG. 2 is a schematic structural diagram of the drive circuit in FIG. 1. FIG. 3 is a schematic structural diagram of a part of circuit in FIG. 2. The display device shown in FIG. 1 includes a display panel Panel, a drive board and a signal source terminal (not shown in the drawing). The signal source terminal is connected to the drive board through the VBO input terminal in FIG. 1, and inputs the display data. The drive board is connected to the display panel Panel, and the drive board includes a Tcon chip. The Tcon chip is used to output the obtained display data to the display panel Panel. The signal source terminal includes a SOC chip, the SOC chip is connected to the Tcon chip, and the SOC chip is used to output display data to the Tcon chip. As shown in FIG. 1 to FIG. 3, the display panel Panel may include a drive circuit S-IC, and the drive circuit S-IC is at least used to drive the display panel Panel to display the obtained display data. The drive circuit S-IC may include a shift register 10, a data buffer 20 and a first control circuit. The shift register 10 may be used to output the display data D of each sub-pixel according to a preset timing sequence; the data buffer 20 at least includes a first cache module Latch1 composed of N repeat units Q. The repeat unit Q includes at least one cache unit, the cache unit is connected to the shift register 10, and the two cache units at the same position in the k-th repeat unit Q and the (k+1)-th repeat unit Q are multiplexed with the same clock signal terminal CK. The cache unit may be used to, in response to the output signal from the clock signal terminal CK connected to the cache unit, be turned on to cache the received display data D, N is a positive integer greater than or equal to 2, and k is an odd number. The first control circuit 100 includes a plurality of first control unit TG1, a first control unit TG1 is connected between any clock signal terminal CK and the cache unit in the (k+1)-th repeat unit Q connected to the any clock signal terminal CK, and the first control unit TG1 may be used to, when the enable signal terminal EN connected to the first control unit TG1 outputs a first control signal, be turned on to copy the display data D corresponding to the cache unit in the k-th repeat unit Q to the cache unit at the corresponding position in the (k+1)-th repeat unit Q.

In the display panel Panel provided by the present disclosure, the drive circuit S-IC includes a first control circuit 100, and the first control circuit 100 includes a plurality of first control units TG1. When the enable signal terminal EN outputs the first control signal, the first control unit TG1 is turned on to copy the display data D of the cache unit in the k-th repeat unit Q to the cache unit at the corresponding position in the (k+1)-th repeat unit Q, so that the same display data D is written into two cache units at the same position in the k-th repeat unit Q and the (k+1)-th repeat unit Q. That is, when the drive circuit S-IC copies a column of display data, reference may be made to the grayscale data of the left and right adjacent pixels, and interpolation transition may be performed to make the image resolution better than the original resolution. Further in conjunction with the timing sequence control at the clock signal terminal CK, the received low-resolution display data D may be written into the high-resolution panel; that is, a low-resolution drive board and signal source terminal may be used to drive a high-resolution panel. In this way, the signal source terminal may be replaced with a low-resolution SOC signal source; for example, 8K changes to 4K, 4K changes to 2K, etc., thus greatly reducing the cost of the SOC. At the same time, the drive board may also be replaced with a low-resolution Tcon board; for example, 8K changes to 4K, 4K changes to 2K, etc., thus greatly reducing the cost of the Tcon board.

It should be noted that, as described in the present disclosure, a certain structure A performing an action C in response to a signal from a structure B connected to the structure A, or the structure A performing the action C when the structure B connected to the structure A is in a certain state, may be understood as the structure A performing the action C in response to a signal from the structure B directly connected to the structure A, or the structure A performing the action C when the structure B directly connected to the structure A is in a certain state. For example, the cache unit is turned on in response to an output signal from the clock signal terminal CK connected the cache unit, that is, the cache unit is turned on in response to an output signal from the clock signal terminal CK directly connected to the cache unit.

The solutions of the present disclosure will be further introduced below in conjunction with the accompanying drawings.

The drive circuit S-IC can be connected with the drive board to obtain the display data D output from the drive board. In some embodiments, the drive circuit S-IC can be connected to the drive board through the shift register 10, so as to convert the serial data of the drive board into parallel display data D through the shift output unit 210, and then output the parallel display data D to the data buffer 20; and then, after signal processing such as level conversion and DA conversion performed by the data buffer 20, the display data D is displayed on the display panel Panel.

In the present disclosure, the first cache module Latch1 includes N repeat units Q, each repeat unit Q includes at least one cache unit, and each cache unit is used to store display data D of one sub-pixel. The display panel Panel usually includes a variety of sub-pixels. Therefore, the cache units may be classified according to the data of different types of sub-pixels stored in the cache units. For example, in actual products, the display panel Panel usually includes sub-pixels of three different colors: R, G, and B. According to the data of the sub-pixels stored in the cache units, the cache units may be classified into R cache units, G cache units and B cache units, where the R cache unit is a cache unit that stores the data of the R sub-pixel, the G cache unit is a cache unit that stores the data of the G sub-pixel, and the B cache unit is a cache unit that stores the data of the B sub-pixel. In other embodiments, the display panel may also include sub-pixels of four different colors: R, G, B, and W. Correspondingly, the cache units are classified into R cache units, G cache units, B cache units and W cache units; the R cache unit is a cache unit that stores the data of the R sub-pixel; the G cache unit is a cache unit that stores the data of the G sub-pixel; the B cache unit is a cache unit that stores the data of the B sub-pixel; and the W cache unit is a cache unit that stores the data of the W sub-pixel. It should be understood that the above examples are only to illustrate the corresponding relationship between the cache units and the sub-pixels, and should not be understood as limitations on the types of sub-pixels in the display panel of the present disclosure.

It should be understood that the number of cache units in each repeat unit Q is the same; and when there is more than one cache unit in the repeat unit Q, the arrangement order of different types of cache units in each repeat unit Q is also the same. For example, a repeat unit Q may include three cache units of an R cache unit, a G cache unit and a B cache unit. Then, the arrangement order of the R cache unit, the G cache unit and the B cache unit in each repeat unit Q is the same; for example, the arrangement order is R cache unit→G cache unit→B cache unit. For convenience of description, the embodiments of the present disclosure are exemplarily illustrated, only based on that the arrangement order of the various cache units in the data buffer 20 is R cache unit→G cache unit→B cache unit. It should be understood that in other embodiments, the various cache units in the repeat unit Q may also be in other arrangement orders, and the present disclosure does not specifically limit the arrangement order of different types of cache units in each repeat unit.

Two cache units at the same position in two repeat units Q may be understood as cache units of the same type in the two repeat units Q, i.e., the cache units in the two repeat units Q where the same type of sub-pixel data is stored. For example, a repeat unit Q may include three cache units: an R cache unit, a G cache unit and a B cache unit. In two repeat units Q, two R cache units constitute a pair of two cache units at the same position in the two repeat units Q; two G cache units constitute another pair of two cache units at the same position in the two repeat units Q; and two B cache units constitute another pair of two cache units at the same position in the two repeat units Q. Correspondingly, a first control unit TG1 is connected between the two cache units at the same position in the k-th repeat unit Q and the (k+1)-th repeat unit Q. That is, a first control unit TG1 is connected between the R cache unit of the k-th repeat unit Q and the R cache unit of the (k+1)-th repeat unit Q; a first control unit TG1 is connected between the G cache unit of the k-th repeat unit Q and the G cache unit of the (k+1)-th repeat unit Q; and a first control unit TG1 is connected between the B cache unit of the k-th repeat unit Q and the B cache unit of the (k+1)-th repeat unit Q. Of course, in other embodiments, a repeat unit Q may also include other numbers of cache units, which will not be described in detail here.

In the present disclosure, the number of cache units included in the first cache module Latch1 may be the same as the number of pixel columns in the display panel Panel; that is, a pixel column corresponds to a cache unit that outputs display data to it. Each cache unit is connected to a clock signal terminal CK. When the clock signal terminal CK outputs a turn-on level, the cache unit may be controlled to be turned on and store the display data D output from the shift register 10. In addition, in the present disclosure, the number of cache units included in the repeat unit Q may be the same as the number of sub-pixels included in a pixel unit in the display panel Panel. For example, the display panel Panel includes a plurality of pixel units distributed in an array with a row direction and a column direction, and a pixel unit may include three sub-pixels of an R sub-pixel, a G sub-pixel, and a B sub-pixel. Then a repeat unit Q in the first cache module Latch1 may include three cache units of an R cache unit, a G cache unit, and a G cache unit. Alternatively, a pixel unit may include four sub-pixels of an R sub-pixel, a G sub-pixel, a B sub-pixel, and a W sub-pixel. Then a repeat unit Q in the first cache module Latch1 may include four cache units of an R cache unit, a G cache unit, a B cache unit, and a W cache unit. Alternatively, when a pixel unit only includes one sub-pixel, a repeat unit Q in the first cache module Latch1 also includes only one cache unit.

Figure 4:
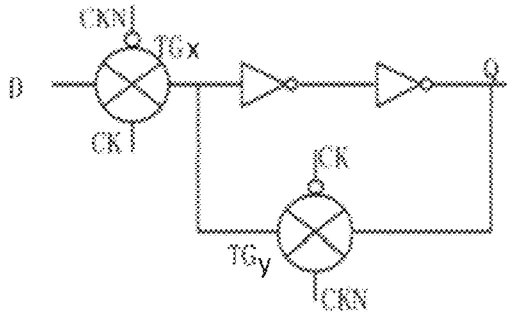
FIG. 4 is a circuit structure diagram of a cache sub-unit according to some embodiments of the present disclosure.

It should be noted that the cache unit in the present disclosure may include a plurality of cache sub-units, and the number of cache sub-units in the same cache unit is the same as the number of data bits included in the display data of a sub-pixel. In some embodiments, the display data of a sub-pixel may include 8-bit data, then a cache unit may include 8 cache sub-units, and each cache sub-unit stores 1-bit data. For example, FIG. 4 is a circuit structure diagram of a cache sub-unit according to some embodiments of the present disclosure, and each cache unit in FIG. 3 includes 8 cache sub-units as shown in FIG. 4. As shown in FIG. 4, the CK terminal in the drawing is connected to the clock signal terminal, and TG is a transmission gate. When the clock signal SR output from the clock signal terminal CK is at a high level, TGx is turned on, TGy is turned off, and the input D is transmitted to the Q terminal. When CK is at a low level, TGx is turned off, TGy is turned on, TGy and two inverters form a loop, and the data at the Q terminal is maintained, that is, the original data is latched.

The enable signal terminal EN may output a first control signal and a second control signal with opposite polarities to control the first control unit TG1 to be turned on or off. When the enable signal terminal EN outputs the first control signal, the first control unit TG1 is turned on, and the first control signal may be a high-level signal, for example. The first control unit TG1 that is turned on may transmit the display data D corresponding to the cache unit in the k-th repeat unit Q to the cache unit at the corresponding position in the (k+1)-th repeat unit Q. That is, it is realized that the display data D corresponding to the cache unit in the k-th repeat unit Q is copied to the cache unit at the corresponding position in the (k+1)-th repeat unit Q, so that the data in the row direction can be multiplied to satisfy the requirement for using a low-resolution signal source terminal to drive a high-resolution display panel Panel, that is, low-resolution display data output from the signal source terminal is written into the high-resolution display panel Panel. Of course, when using a low-resolution signal source terminal to drive a high-resolution display panel, it is also necessary to realize multiplication of the display data in the column direction. The solution of realizing data multiplication in the column direction may be referred to the introduction of followings embodiments, which is not described here.

For example, when the shift register 10 outputs display data corresponding to the first sub-pixel to the third sub-pixel, the clock signal terminal CK firstly controls the R cache unit in the first repeat unit Q1 to be turned on, and the first sub-pixel data D1 is stored into the R cache unit in the first repeat unit Q1. At the same time, since the first control unit TG1 is turned on, the first sub-pixel data D1 is simultaneously transmitted to the R cache unit in the second repeat unit Q2, realizing that the first sub-pixel data D1 is simultaneously stored into the R cache units of the first repeat unit Q1 and the second repeat unit Q2, so that the two R cache units in the first repeat unit Q1 and the second repeat unit Q2 store with the same data.

Then, the clock signal terminal CK controls the G cache unit in the first repeat unit Q1 to be turned on, and the second sub-pixel data D2 is stored into the G cache unit in the first repeat unit Q1. At the same time, since the first control unit TG1 is turned on, the second sub-pixel data D2 is simultaneously transmitted to the G cache unit in the second repeat unit Q2, realizing that the second sub-pixel data D2 is simultaneously stored into two G cache units of the first repeat unit Q1 and the second repeat unit Q2.

Then, the clock signal terminal CK controls the B cache unit in the first repeat unit Q1 to be turned on, and the third sub-pixel data D3 is stored into the B cache unit in the first repeat unit Q1. At the same time, since the first control unit TG1 is turned on, the third sub-pixel data D3 is transmitted to the B cache unit in the second repeat unit Q2, realizing that the third sub-pixel data D3 is simultaneously stored into two B cache units of the first repeat unit Q1 and the second repeat unit Q2.

In this way, it is realized that the data of the first two large pixels is completely the same.

When the shift register 10 outputs the fourth sub-pixel data D4 to the sixth sub-pixel data D6, the clock signal terminal CK controls the R cache unit in the third repeat unit Q3 to be turned on, and the fourth sub-pixel data D4 is stored into the R cache unit in the repeat unit Q3. At the same time, since the first control unit TG1 is turned on, the fourth sub-pixel data D4 is transmitted to the R cache unit of the fourth repeat unit Q4, realizing that the fourth sub-pixel data D4 is simultaneously stored into two R cache units of the third repeat unit Q3 and the fourth repeat unit Q4. Similarly, under the control of the clock signal terminal CK and the enable signal terminal EN, the fifth sub-pixel data D5 is simultaneously stored into the G cache units in the third repeat unit Q3 and the fourth repeat unit Q4, and the sub-pixel data D6 is simultaneously stored into the B cache units in the third repeat unit Q3 and the fourth repeat unit Q4. In this way, R3=R4, G3=G4, and B3=B4, realizing that the data of another two large pixels is completely the same.

Taking a 4K signal source terminal as an example, by repeating in this way, the data of 480 channel output from the shift register 10 may be copied once; the data of two adjacent pixel units (i.e., two adjacent large pixels) is the same, is written into the entire first cache module Latch1, and then is displayed by the display panel Panel after signal processing by the level conversion circuit 30, the data digital-to-analog conversion circuit 40, etc., thus realizing transverse data expansion and replication.

As shown in FIG. 3, in some embodiments, two cache units at the same position in the k-th repeat unit Q and the (k+1)-th repeat unit Q are multiplexed with a same clock signal terminal CK. In some embodiments, the cache unit in the (k+1)-th repeat unit Q is multiplexed with the clock signal terminal CK corresponding to the cache unit at the same position in the k-th repeat unit Q. It can be understood that each cache unit is connected to a clock signal terminal CK correspondingly. In this way, in addition to being connected to the clock signal terminal CK corresponding to it, the cache unit in the (k+1)-th repeat unit Q is further connected to the clock signal terminal CK corresponding to the cache unit in the k-th repeat unit Q, so that each cache unit in the (k+1)-th repeat unit Q is connected to two clock signal terminals CK. On this basis, a first control unit TG1 is connected between the cache unit in the (k+1)-th repeat unit Q and the clock signal terminal CK multiplexed with it, and the first control unit TG1 can control the cache unit in the (k+1)-th repeat unit Q to be turned on or off from the clock signal terminal CK multiplexed with it. When the enable signal terminal EN outputs the first control signal at a turn-on level, the first control unit TG1 is turned on, so that a path is formed between the cache unit in the (k+1)-th repeat unit Q and the clock signal terminal CK multiplexed with it. In this way, when the clock signal terminal CK connected to the cache unit in the k-th repetition unit Q outputs the clock signal SR at the turn-on level, the clock signal SR at the turn-on level controls the two cache units in the k-th repeat unit Q and the (k+1)-th repeat unit Q that are connected to the clock signal terminal CK to be both turned on, so that the display data D stored in the cache unit in the k-th repeat unit Q is also written to the corresponding cache unit in the (k+1)-th repeat unit Q. It should be understood that when writing the display data D, each clock signal terminal CK also needs to output the clock signal SR according to a set timing sequence to cooperate with the storage of the display data D. The timing sequence of the clock signal SR output from each clock signal terminal CK can be referred to the introduction of following embodiments, which is not be described here.

In addition, in other embodiments, the cache unit in the k-th repeat unit Q can also be multiplexed with the clock signal terminal CK corresponding to the cache unit in the (k+1)-th repeat unit Q, and the timing sequence of the clock signal SR output from each clock signal terminal CK can be adaptively adjusted, which is not described in detail here.

Figure 5:
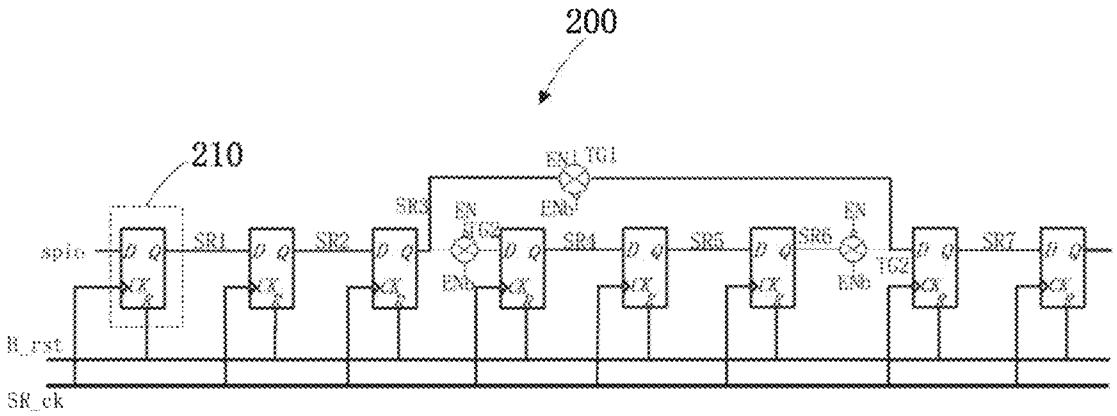
FIG. 5 is a schematic structural diagram of a clock circuit according to some embodiments of the present disclosure.

In some embodiments, the drive circuit S-IC may also include a clock circuit 200. FIG. 5 is a schematic structural diagram of a clock circuit according to some embodiments of the present disclosure. As shown in FIG. 5, the clock circuit 200 may be implemented by a shift register circuit. For example, the clock circuit 200 may include a plurality of cascaded shift output units 210. The shift output unit 210 may be, for example, a D flip-flop. Each shift output unit 210 is provided with a clock signal terminal CK described in the above embodiments. The shift output unit 210 may be used to output the clock signal SR through the clock signal terminal CK corresponding to it. When the clock signal SR output from the clock signal terminal CK is at a turn-on level (for example, the turn-on level may be a high level), the cache unit connected to the clock signal terminal CK is turned on to store the display data D output from the shift register 10. For example, when the shift register 10 outputs the second sub-pixel data D2, the clock signal SR2 output from the clock signal terminal (denoted as the second clock signal terminal CK2) of the second shift output unit 210 in the clock circuit 200 is at a high level, the second clock signal terminal CK2 corresponds to the second cache unit in the first repeat unit Q1, and the second clock signal terminal CK2 controls the second cache unit in the first repeat unit Q1 to be turned on, so that the cache unit stores and obtains the second sub-pixel data D2.

Figure 6:
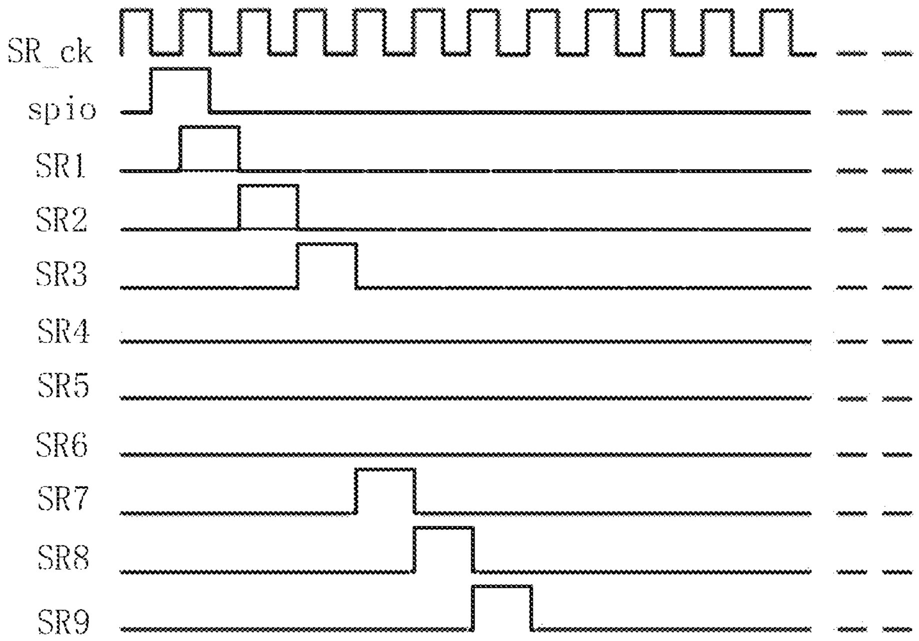
FIG. 6 is a timing sequence diagram corresponding to the circuit structure in FIG. 5.

It should be noted that in the example embodiments, since data replication needs to be performed, the timing sequence of the clock signal SR output from the clock circuit 200 needs to be adjusted accordingly. The output terminal of the (e×n)-th shift output unit 210 is cascaded to the input terminal of the (e×n+1)-th shift output unit 210 through a second transmission gate TG2, and is cascaded to the input terminal of the (e×n+(e+1))-th shift output unit 210 through a first transmission gate. The output terminal of the (e×n+e)-th shift output unit 210 is cascaded to the input terminal of the (e×n+(e+1))-th shift output unit 210 through another second transmission gate TG2; e is the number of sub-pixels included in the pixel unit in the display panel, n is an odd number, and the turn-on level of the second transmission gate TG2 has an opposite polarity to the turn-on level of the first the transmission gate. For example, a pixel unit may include three sub-pixels of RGB, then e=3; or, a pixel unit may include four sub-pixels of RGBW, then e=4. Taking a pixel unit including three sub-pixels shown in FIG. 5 as an example, e=3. FIG. 6 is a timing sequence diagram corresponding to the circuit structure of FIG. 5. As shown in FIG. 6, when the drive circuit S-IC is in a replication mode, the first control unit TG1 is turned on, and the second control unit TG2 is turned off. At this time, the fourth-stage shift output unit in the clock circuit 200 cannot obtain the cascade signal. Correspondingly, neither the fifth-stage shift output unit nor the third-stage shift output unit can obtain the cascade signal, so that none of the fourth-stage shift output unit to the sixth-stage shift output unit will output a clock signal (that is, to output a non-turn-on level signal, such as outputting a low-level signal). The seventh-stage shift output unit obtains the cascade signal of the third-stage shift output unit and outputs a clock signal. In this way, it is equivalent to advancing the clock signal output from the seventh-stage shift output unit and causing the fourth-stage shift output unit to the sixth-stage shift output unit not to output clock signals. In this way, in conjunction with the introduction of FIG. 3 and the above embodiments, when the shift register 10 outputs display data D1 to display data D3 of the first three sub-pixels, under the control of the clock signal SR1 to the clock signal SR3 output from the first clock signal terminal CK1 to the third clock signal terminal CK3, the display data D1 to the display data D3 of the first three sub-pixels are stored into the R cache units (R1, R2), the G cache units (G1, G2) and the B cache units (B1, B2) in the first repeat unit Q1 and the second repeat unit Q2 respectively. When the shift register 10 outputs the fourth sub-pixel display data D4, under the control of the clock signal SR7 output from the seventh clock signal terminal CK7, the fourth sub-pixel display data D4 is stored into the R cache units (R3, R4) in the third repeat unit Q3 and the fourth repeat unit Q4. In this way, the fifth sub-pixel display data D5 is stored into the G cache units (G3, G4) in the third repeat unit Q3 and the fourth repeat unit Q4; the sixth sub-pixel display data D is stored into the B cache units (B3, B4) in the third repeat unit Q3 and the fourth repeat unit Q4. By repeating in this way, the multiplication and cache of the display data D in the row direction for the drive circuit S-IC in the replication mode is completed.

In some embodiments, the data buffer 20 may further include a second cache module Latch2 (not shown in the drawing). The second cache module Latch2 may include a plurality of storage units, and the storage units are connected to the various cache units in the first cache module Latch1 in one to one correspondence. The storage unit is used to output the display data D stored in the cache unit to the level conversion circuit 30, the digital-to-analog conversion circuit 40, etc., at the subsequent stage, and finally to the data line Data in the display panel Panel. In this way, the data cached in the first cache module Latch1 may be output to each data line Data in the display panel Panel through each storage unit in the second cache module Latch2; that is, the display data D is output to the data line Data, and the display data D of each sub-pixel is displayed correspondingly by each sub-pixel in the display panel Panel. It can be understood that the circuit structure of each storage unit in the second cache module Latch2 may be the same as the circuit structure of the cache unit in the first cache module Latch1, which is not specifically limited here.

In some embodiments, the first control unit TG1 may be implemented by a transmission gate. Referring to FIG. 3, the first control unit TG1 may include a first transmission gate; the first transmission gate is connected to the enable signal terminal EN and two cache units at the same position in the k-th repeat unit Q and the (k+1)-th repeat unit Q. The first transmission gate may be used to transmit the display data D stored in the cache unit in the k-th repeat unit Q to the corresponding cache unit in the (k+1)-th repeat unit Q in response to the first control signal output from the enable signal terminal EN, where k is an odd number. For example, a first transmission gate is connected between the R cache unit R1 in the first repeat unit Q1 and the R cache unit R2 in the second repeat unit Q2. When the enable signal terminal EN outputs the first control signal, the first transmission gate is turned on. When the clock signal terminal CK connected to the R cache unit R1 in the first repeat unit Q1 outputs the clock signal SR1, the first sub-pixel display data D1 is stored into the R cache unit R1 of the first repeat unit Q1; at the same time, the first sub-pixel display data D1 is transmitted to the R cache unit R2 of the second repeat unit Q2 since the first transmission gate is turned on, realizing that the two R cache units (R1, R2) in the first repeat unit Q1 and the second repeat unit Q2 are stored with the same display data D1. The principle of performing display data replication by other cache units through the first transmission gate is similar to the above, which is not described in detail here. It should be understood that the present disclosure does not improve the circuit structure of the transmission gate, and the transmission gate in the related art may be used. In addition, it should be understood that the first control unit TG1 can also be implemented by other circuit structures, for example, it can be implemented by a transistor, etc., which is not described in detail here.

Figure 7:
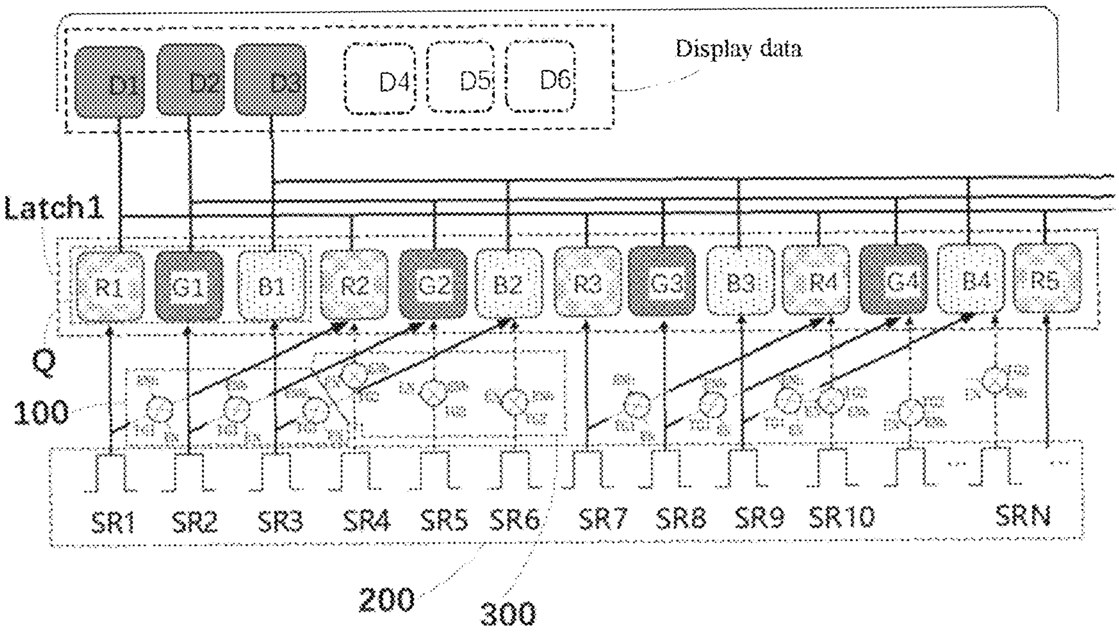
FIG. 7 is a schematic structural diagram of a part of circuit in FIG. 2 according to some embodiments of the present disclosure.

In some embodiments, the drive circuit S-IC may further include a second control circuit 300. FIG. 7 is a schematic structural diagram of a part of the circuit in FIG. 2 according to some embodiments of the present disclosure. As shown in FIG. 7, the second control circuit 300 may include m second control units TG2. A second control unit TG2 is connected in series between the cache unit in the (k+1)-th repeat unit Q and the clock signal terminal CK corresponding to it. The second control unit TG2 may be turned off when the enable signal terminal EN outputs the first control signal, or be turned on when the enable signal terminal EN outputs the second control signal, where the first control signal and the second control signal have opposite polarities, and k is an odd number. Among them, the enable signal terminal EN can output high-level signals and low-level signals. The first control signal and the second control signal having opposite polarities may be understood as, the second control signal is at a low level when the first control signal is at a high level, or the second control signal is at a high level when the first control signal is at a low level. When the enable signal terminal EN outputs the first control signal, the first control unit TG1 is turned on and the second control unit TG2 is turned off. At this time, the drive circuit S-IC is in the data replication mode. At this time, as mentioned above, since each cache unit in the (k+1)-th repeat unit Q is further connected to the clock signal terminal CK corresponding to itself, and a clock signal terminal corresponds to a shift output unit 210 as shown in FIG. 5, if the clock signal terminal CK corresponding to itself is not isolated, the shift output unit 210 corresponding to the clock signal terminal will be connected to the clock signal terminal of the corresponding cache unit in the k-th repeat unit Q through the cache unit in the (k+1)-th repeat unit Q, so that the clock signal terminal CK of the corresponding cache unit in the k-th repeat unit Q have an extra load. It can be understood that when the load increases, the clock signal SR output from the clock signal terminal will be distorted to a certain extent, thus affecting the performance of the circuit performance. In other words, in the example embodiment, through the additionally provided second control circuit 300, each second control unit TG2 in the second control circuit 300 forms an open circuit between the corresponding clock signal terminal and the cache unit, thus isolating unnecessary loads, ensuring that the circuit outputs a stable clock signal SR and ensuring normal operation of the circuit.

As shown in FIG. 7, the second control unit TG2 may also be implemented by a transmission gate. The second control unit TG2 may include a second transmission gate. It can be understood that the second transmission gate may have the same circuit structure as the first transmission gate, and the difference is that the polarity of the turn-on level for the second transmission gate is opposite to the polarity of the turn-on level for the first transmission gate; that is, the second transmission gate is turned off when the first transmission gate is turned on, and the second transmission gate is turned on when the first transmission gate is turned off. Moreover, the second transmission gate may also be referred to the transmission gate structure in the related art, which is not described in detail here.

As shown in FIG. 1, the display panel Panel of the present disclosure further includes a gate drive circuit GOA (Gate Driver on Array). The gate drive circuit GOA may be used to output gate control signals to each row of gate lines Gate, so as to perform row scan on the display panel Panel. For example, the gate drive circuit GOA may include a plurality of cascaded shift register units. Each shift register unit sequentially shifts and outputs a gate control signal to the gate line Gate of the corresponding pixel row, so as to perform row scan on the display panel Panel. When the gate control signal is at the turn-on level, the gate line Gate of the corresponding row controls the pixel circuit of each sub-pixel in the pixel row to be turned on, and the display data on the data line Data is written to the corresponding sub-pixel for display. The specific structure of the gate drive circuit GOA is not limited in the present disclosure particularly.

In some embodiments, frequency multiplication may be performed on the display data in the column direction through the gate control signal output from the gate drive circuit GOA. The drive circuit may be used to receive the row data to be displayed in sequence, and apply the received x-th row data to be displayed to the (2x−1)-th row of sub-pixels and the 2x-th row of sub-pixels respectively. The gate drive circuit may be used to control the (2x−1)-th row of sub-pixels to be charged for 1H and control the 2x-th row of sub-pixels to be charged for 2H, where x is a natural number greater than or equal to 1 and less than N, and N is the total number of pixel rows in the panel. Alternatively, the drive circuit may be used to receive the row data to be displayed in sequence, and apply the received x-th row data to be displayed to the (2x−1)-th row of sub-pixels and the 2x-th row of sub-pixels respectively; the gate drive circuit may be used to control both the (2x−1)-th row of sub-pixels and the 2x-th row of sub-pixels to be charged for 2H, where x is a natural number greater than or equal to 1 and less than N, and N is the total number of pixel rows in the panel. Through the above-mentioned row scan manner, it may be realized that the data of the display panel Panel in the column direction is doubled. For example, the data of 2K rows sent from the front terminal is rushed into the display panel Panel of 4K rows, and the longitudinal refresh frequency is doubled. With regard to the realization of frequency multiplication of data in the column direction, reference may be made to the introduction of following method embodiments, which is not described here.

The present disclosure further provides a driving method for a display panel Panel, used to drive the display panel Panel according to any of the above embodiments of the present disclosure. The driving method may be performed by a drive circuit S-IC. The driving method may include the following steps.

In S110, a first control signal output from the enable signal terminal EN is obtained, where the first control signal is used to control the first control unit TG1 to be turned on.

Among them, when the enable signal terminal EN outputs the first control signal, the drive circuit S-IC is in the data replication mode. The first control signal may control the first control unit TG1 to be turned on, through which the clock signal terminal CK connected to the first control unit TG1 that is turned on forms a path with the corresponding cache unit, so that the display data D output from the shift register 10 may be stored in the cache unit.

In S120, the display data output from the signal source terminal is obtained, and the obtained serial data signal is converted into a parallel signal through the shift register 10 and then output.

Among them, the shift register 10 may convert the serial display data D into parallel display data D and then output it to the data buffer 20. The data buffer 20 may cache the display data D of three sub-pixels, or may cache the display data D of six sub-pixels or more sub-pixels, which is not specifically limited here. The present disclosure is exemplarily illustrated by taking that the data buffer 20 caches the display data D of three sub-pixels as an example.

In S130, the clock signal SR output from the clock signal terminal CK is obtained, and the received display data D is cached through the cache unit in response to the clock signal SR output from the clock signal terminal CK connected the cache unit, where the display data D of the cache unit in the k-th repeat unit Q in the data buffer 20 is copied to the cache unit at the corresponding position in the (k+1)-th repeat unit Q through the first control unit TG1, and k is an odd number.

Among them, the clock signal SR is output from the clock signal terminal CK of each shift output unit 210 in the clock circuit 200. For example, k=1, when the shift register 10 outputs the first sub-pixel display data D1, the clock signal terminal CK connected to the R cache unit R1 in the first repeat unit Q1 outputs the clock signal SR1, which controls the R1 to be turned on to store the obtained first sub-pixel data D1. At the same time, the first control unit TG1 is turned on, and the R storage unit R2 in the second repeat unit Q2 is also turned on under the control of the clock signal SR1; in this way, the first sub-pixel data D1 is also stored into the R2 in the second repeat unit Q2 simultaneously. By repeating in this way, the data in the row direction may be doubled, realizing data multiplication in the row direction and writing the low-resolution display data to the high-resolution display panel Panel, thus realizing that the low-resolution signal source terminal is used to drive the high-resolution display panel Panel.

Figure 8:
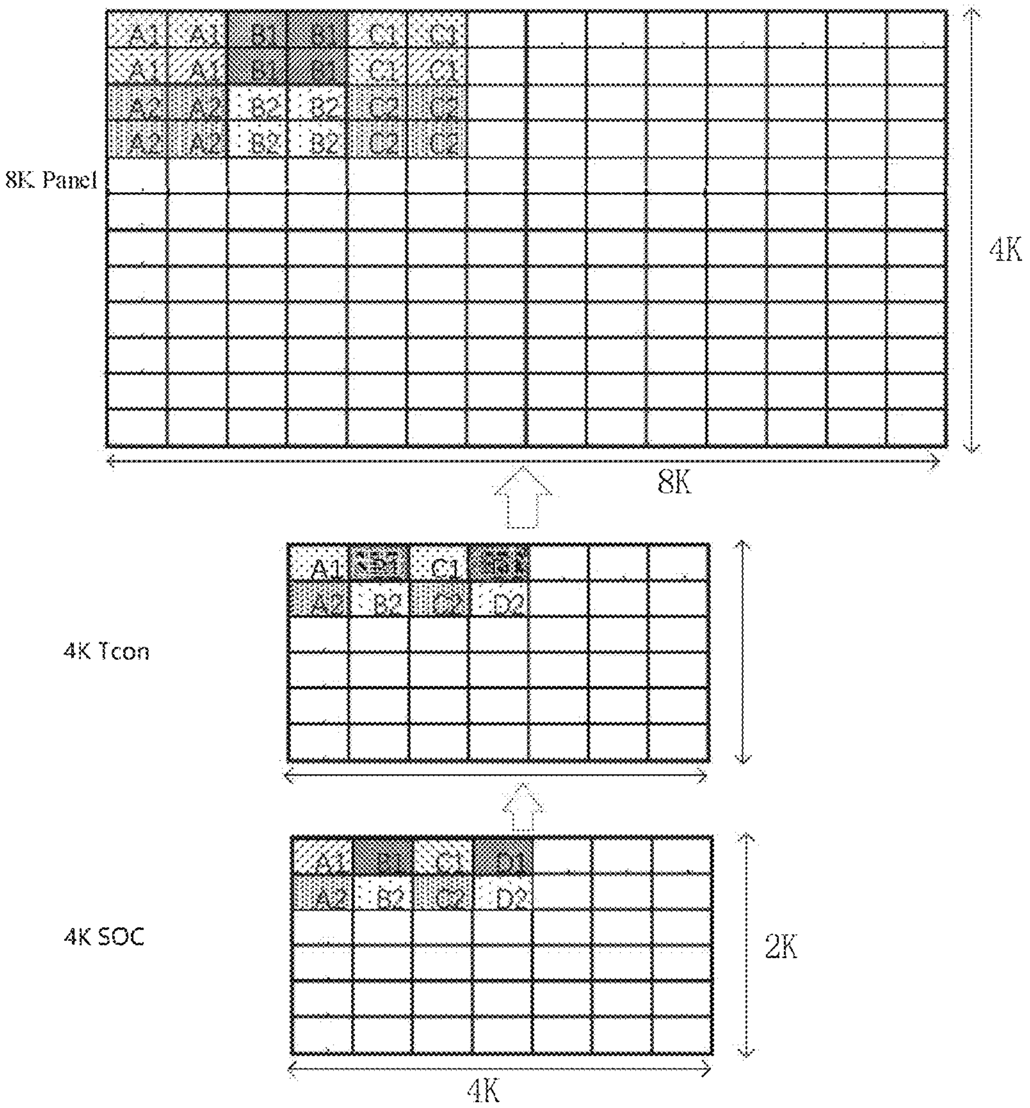
FIG. 8 is a schematic diagram of data display according to some embodiments of the present disclosure.

FIG. 8 is a schematic diagram of data display according to some embodiments of the present disclosure. In the drawing, the SOC chip and the Tcon chip at the signal source terminal each has a resolution of 4 k, and the display panel Panel at the display terminal has a resolution of 8 k. As shown in FIG. 8, through the above driving method, the 4 k display data in the row direction can be expanded to the 8 k display panel Panel, and can be written to all 8 k pixel units in the row direction of the display panel Panel.

Figure 9:
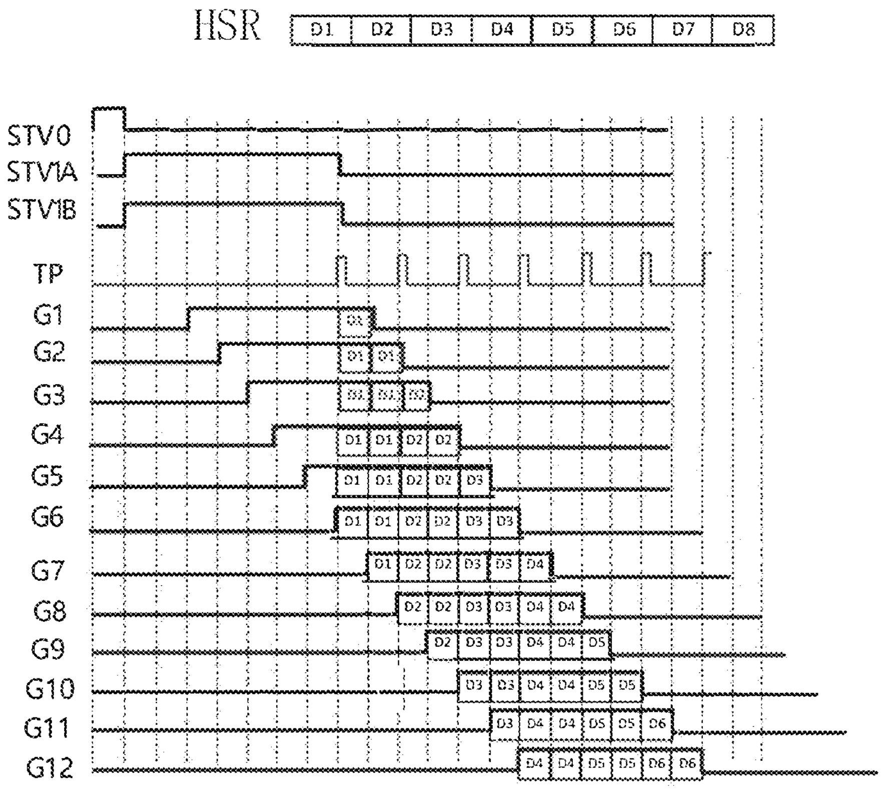
FIG. 9 is a scan timing sequence diagram of a gate drive circuit according to some embodiments of the present disclosure.

In some embodiments, the driving method may further include: receiving sequentially, by the drive circuit, the row data to be displayed; applying the obtained x-th row data to be displayed to the (2x−1)-th row of sub-pixels and the 2x-th row of sub-pixels respectively; and controlling, by the gate drive circuit, the (2x−1)-th row of sub-pixels to be charged for 1H and the 2x-th row of sub-pixels to be charged for 2H, where x is a natural number greater than or equal to 1 and less than N, and N is the a total number of pixel rows in the display panel. FIG. 9 is a scan timing sequence diagram of a gate drive circuit according to some embodiments of the present disclosure. In the drawing, TP is the clock signal for data writing, and the period between two adjacent TP signals is 2H. The overlapping part of the period between two adjacent TP signals with each row Gn is the charging period, such as G1-1H, G2-2H, G3-1H, . . . ; that is, odd-numbered rows are charged for 1H, and even-numbered rows are charged for 2H. Of course, in other embodiments, odd-numbered rows may also be charged for 2H and even-numbered rows may also be charged for 1H. As shown in FIG. 9, at this time, the gate drive circuit GOA runs in an HSR (Hardware Super Resolution) mode. As shown in FIG. 9, the period that each row of sub-pixels is in the on state (in which the corresponding gate control signal, such as G1-G12, is at a high level) includes a charging period and a pre-charging period before the charging period, where the duration of the charging period is equal to 2 times of a unit scan time 1H, and the duration of the pre-charging period is greater than or equal to a unit scan time 1H. For example, in FIG. 9, the duration that each row of sub-pixels is in the on state is 6H, in which the first 4H is the pre-charging period and the last 2H is the charging period. The pre-charging period of each row of sub-pixels includes a first pre-charging period, and the duration of the first pre-charging period is equal to the unit scan time 1H. For example, the first pre-charging period is a period before the charging period and immediately adjacent to the charging period, and the duration of this period is 1H. For example, in some embodiments, as shown in FIG. 9, the start and end times of the periods that two adjacent rows of sub-pixels are in the on state differ by a unit scan time of 1H; correspondingly, the start and end times of the pre-charging period of two adjacent rows of sub-pixels differ by a unit scan time of 1H, and the start and end times of the charging periods of two adjacent rows of sub-pixels differ by a unit scan time of 1H. 1H is the time required to scan a row of sub-pixels, which is the ratio of the effective display time of a frame of data to all pixel rows in the display panel Panel, and a frame of time is the reciprocal of the refresh frequency.

For example, as shown in FIG. 9, D1 in the drawing represents the first row data to be displayed, D2 represents the second row data to be displayed, D3 represents the third row data to be displayed, D8 represents the eighth row data to be displayed, and so on. After receiving the first row data to be displayed, the drive circuit applies the first row data to be displayed to the first row of sub-pixels and the second row of sub-pixels respectively; and the gate drive circuit controls the first row of sub-pixels to be charged for 1H, and controls the second row of sub-pixels to be charged for 2H. After receiving the second row data to be displayed, the drive circuit applies the second row data to be displayed to the third row of sub-pixels and the fourth row of sub-pixels; and the gate drive circuit control the third row of sub-pixels to be charged for 1H, and controls the fourth row of sub-pixels to be charged for 2H. After receiving the third row data to be displayed, the drive circuit applies the third row data to be displayed to the fifth row of sub-pixels and the sixth row of sub-pixels respectively; and the gate drive circuit controls the fifth row of sub-pixels to be charged for 1H, and controls the sixth row of sub-pixels to be charged for 2H. In this way, the data writing in the first row scan cycle is completed. Then the data writing in the second row scan cycle starts. After receiving the fourth row data to be displayed, the drive circuit applies the fourth row data to be displayed to the seventh row of sub-pixels and the eighth row of sub-pixels respectively; and the gate drive circuit controls the seventh row of sub-pixels to be charged for 1H, and controls the eighth row of sub-pixels to be charged for 2H. After receiving the fifth row data to be displayed, the drive circuit applies the fifth row data to be displayed to the ninth row of sub-pixels and the tenth row of sub-pixels respectively; and the gate drive circuit controls the ninth row of sub-pixels to be charged for 1H, and controls the tenth row of sub-pixels to be charged for 2H. After receiving the sixth row data to be displayed, the drive circuit applies the sixth row to be displayed to the eleventh row of sub-pixels and the twelfth row of sub-pixels respectively; and the gate drive circuit controls the eleventh row of sub-pixels to be charged for 1H, and controls the twelfth row of sub-pixels to be charged for 2H. In this way, the data writing in the second row scan cycle is completed, and so on.

In the above embodiments, charging improvement may be realized through pre-charging, because there is almost no need to consider the rise delay for the data signal and the difference between the data signals of two adjacent rows is small. Therefore, the image quality of the display device is good.

In this way, row scan is performed in sequence. That is, the first row data sent from the Tcon is output to the first row and the second row of the panel, and the second row data sent from the Tcon is output to the third row and the fourth row of the panel, so as to complete scan of the panel with 4K rows in sequence.

It should be understood that in the example embodiment, the charging period and the pre-charging period are to distinguish two different periods (sub-periods) in the period that each row of sub-pixels is in the on state. The pre-charging operation may not be performed in a part or all of the pre-charging period of a certain row or several rows of sub-pixels. For example, the pre-charging operation may not be performed on the first row of sub-pixels and the second row of sub-pixels. In addition, the pre-charging operation may not be performed in the first half of the charging period of the first row of sub-pixels.

In the example embodiment, by sequentially turning on each row of sub-pixels and applying data signals to each row of sub-pixels that are simultaneously in the on state, the actual charging duration (i.e., the total duration of the pre-charging period and the charging period) of some sub-pixels can reach 2H or more.

Figure 10:
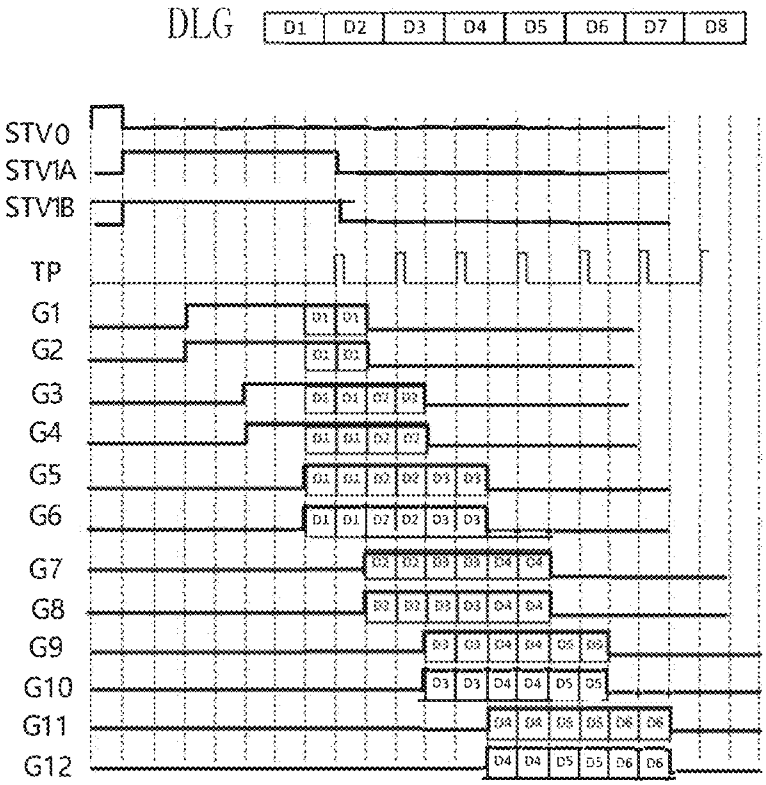
FIG. 10 is a scan timing sequence diagram of a gate drive circuit according to some embodiments of the present disclosure.

In some embodiments, the driving method may further include: receiving sequentially, by the drive circuit, row data to be displayed; applying the received x-th row data to be displayed to the (2x−1)-th row of sub-pixels and the 2x-th row of sub-pixels respectively, where the charging durations of the (2x−1)-th row of sub-pixels and the 2x-th row of sub-pixels are both 2H; and controlling, by the gate drive circuit, both the (2x−1)-th row of sub-pixels and the 2x-th row of sub-pixels to be charged for 2H, where x is a natural number greater than or equal to 1 and less than N, and N is the total number of pixel rows in the panel. FIG. 10 is a scan timing diagram of a gate drive circuit according to some embodiments of the present disclosure. In the drawing, TP is the clock signal for data writing, and the period between two adjacent TP signals is 2H. The overlapping part of the period between the two adjacent TP signals with each row Gn is the charging period. In the example embodiment, the charging period of each row is 2H. As shown in FIG. 10, at this time, the gate drive circuit GOA runs in a DLG (Dual Line Gate) mode. As shown in FIG. 10, the period that each row of sub-pixels is in the on state (i.e., the corresponding gate control signal, such as G1-G6, is at a high level) includes the charging period and the pre-charging period before the charging period, where the duration of the charging period is equal to 2 times of a unit scan time 1H, and the duration of the pre-charging period is greater than or equal to a unit scan time 1H. For example, in FIG. 10, the duration that each row of sub-pixels is in the on state is 6H, in which the first 4H is the pre-charging period and the last 2H is the charging period. The pre-charging period of each row of sub-pixels includes a first pre-charging period, and the duration of the first pre-charging period is equal to a unit scan time 1H. For example, the first pre-charging period is a period before the charging period and immediately adjacent to the charging period, and the duration of this period is 1H. In some embodiments, there may be no pre-charging period for the first row of sub-pixels and the second row of sub-pixels.

For example, in some embodiments, as shown in FIG. 10, the start and end times of the periods that the (2x−1)-th row of sub-pixels and the 2x-th row of sub-pixels are in the on state are the same, where x is a natural number greater than or equal to 1 and less than N, and N is a total number of pixel rows in the panel. Accordingly, the start and end times of the pre-charging periods of the (2x−1)-th row of sub-pixels and the 2x-th row of sub-pixels are the same, and the start and end times of the charging periods of the (2x−1)-th row of sub-pixels and the 2x-th row of sub-pixels are the same.

For example, as shown in FIG. 10, after receiving the first row data to be displayed, the first row data to be displayed is applied to the first row of sub-pixels and the second row of sub-pixels respectively; and the gate drive circuit controls the first row of sub-pixels and the second row of sub-pixels both to be charged for 2H. After receiving the second row data to be displayed, the second row data to be displayed is applied to the third row of sub-pixels and the fourth row of sub-pixels respectively; and the gate drive circuit controls the third row of sub-pixels and the fourth row of sub-pixels both to be charged for 2H. After receiving the third row data to be displayed, the third row data to be displayed is applied to the fifth row of sub-pixels and the sixth row of sub-pixels respectively; and the gate drive circuit controls the fifth row of sub-pixels and the sixth row of sub-pixels both to be charged for 2H. In this way, data writing in the first row scan cycle is completed. Then, after receiving the fourth row data to be displayed, the fourth row data to be displayed is applied to the seventh row of sub-pixels and the eighth row of sub-pixels respectively; and the gate drive circuit controls the seventh row of sub-pixels and the eighth row of sub-pixels both to be charged for 2H. And the like, after receiving the sixth row data to be displayed, the sixth row data to be displayed is applied to the eleventh row of sub-pixels and the twelfth row of sub-pixels respectively; and the gate drive circuit controls the eleventh row of sub-pixels and the twelfth row of sub-pixels both to be charged for 2H. At this time, data writing in the second row scan cycle is completed. The data of 2 k rows sent from the front terminal can be flushed into a panel of 4 k rows.

In some embodiments, as shown in FIG. 10, D1 in the drawing represents the first row of data to be displayed, D2 represents the second row of data to be displayed, D3 represents the third row of data to be displayed, D4 represents the fourth row data to be displayed, D8 represents the eighth row data to be displayed, and so on. The rising edge of the on-signal STV1 is 2H or 3H earlier than the first gate control signal G1. The descending edges of the on-signals STV1A and STV1B correspond to the start times of the charging periods of the first row of sub-pixels (corresponding to the first gate control signal G1) and the second row of sub-pixels in (corresponding to the second gate control signal G2).

In some embodiments, as shown in FIG. 10, the pre-charging periods of the fifth row of sub-pixels (corresponding to the fifth gate control signal G5) and the sixth row of sub-pixels (corresponding to the sixth gate control signal G6) overlap with the charging periods of the first row of sub-pixels (corresponding to the first gate control signal G1) and the second row of sub-pixels (corresponding to the second gate control signal G2), and the overlapping time is at least 2H. For example, the start times of the pre-charging periods of the fifth row of sub-pixel and the sixth row of sub-pixel are consistent with the start times of the charging period of the first row of sub-pixels and the second row of sub-pixels.

In the driving method of the present disclosure, the resolution that can be supported transversely, is doubled through transverse expansion of the drive circuit S-IC; the longitudinal gate drive circuit GOA is used in the HSR/DLG mode, so as to expand and double the longitudinal resolution, so that the longitudinal resolution is better than the original resolution. The 4K data sent from the 4K Tcon chip can be expanded to the entire 8K display panel Panel, greatly reducing the costs of the SOC chip and the Tcon chip. Furthermore, based on the driving method of the present disclosure, resolution and refresh rate can be upgraded under 8K/4K low-specification processing or a specific SOC.

The present disclosure further provides a display device, which may be a television, for example. As shown in FIG. 1, the display device may include the display panel Panel according to any of the above embodiments of the present disclosure, as well as a drive board and a signal source terminal. The drive board is connected to the display panel Panel, and the drive board includes a Tcon chip. The Tcon chip is used to output the obtained display data to the display panel Panel. The signal source terminal includes a SOC chip, the SOC chip is connected to the Tcon chip, and the SOC chip is used to output display data to the Tcon chip.

In the display device provided by the example embodiments of the present disclosure, the resolution of the SOC chip and the resolution of the Tcon chip are both ¼ of the resolution of the display panel Panel. For example, the resolutions of the SOC chip and the Tcon chip are both 4 k, and the resolution of the display panel Panel is 8 k. Under this architecture, the display data can be copied and doubled through the drive circuit S-IC in the display panel Panel provided by the present disclosure, thus expanding and doubling the resolution that can be supported transversely. At the same time, longitudinally, the gate drive circuit GOA is used in the HSR/DLG mode to double the longitudinal resolution. In this way, a drive board (Tcon board) and a signal source terminal (SOC system) with resolutions 4 times lower than the resolution of the display panel Panel are used to drive the display panel Panel. For example, a 4 k SOC chip and a 4 k Tcon chip are used to drive 8 k display panel Panel.

Figure 11:
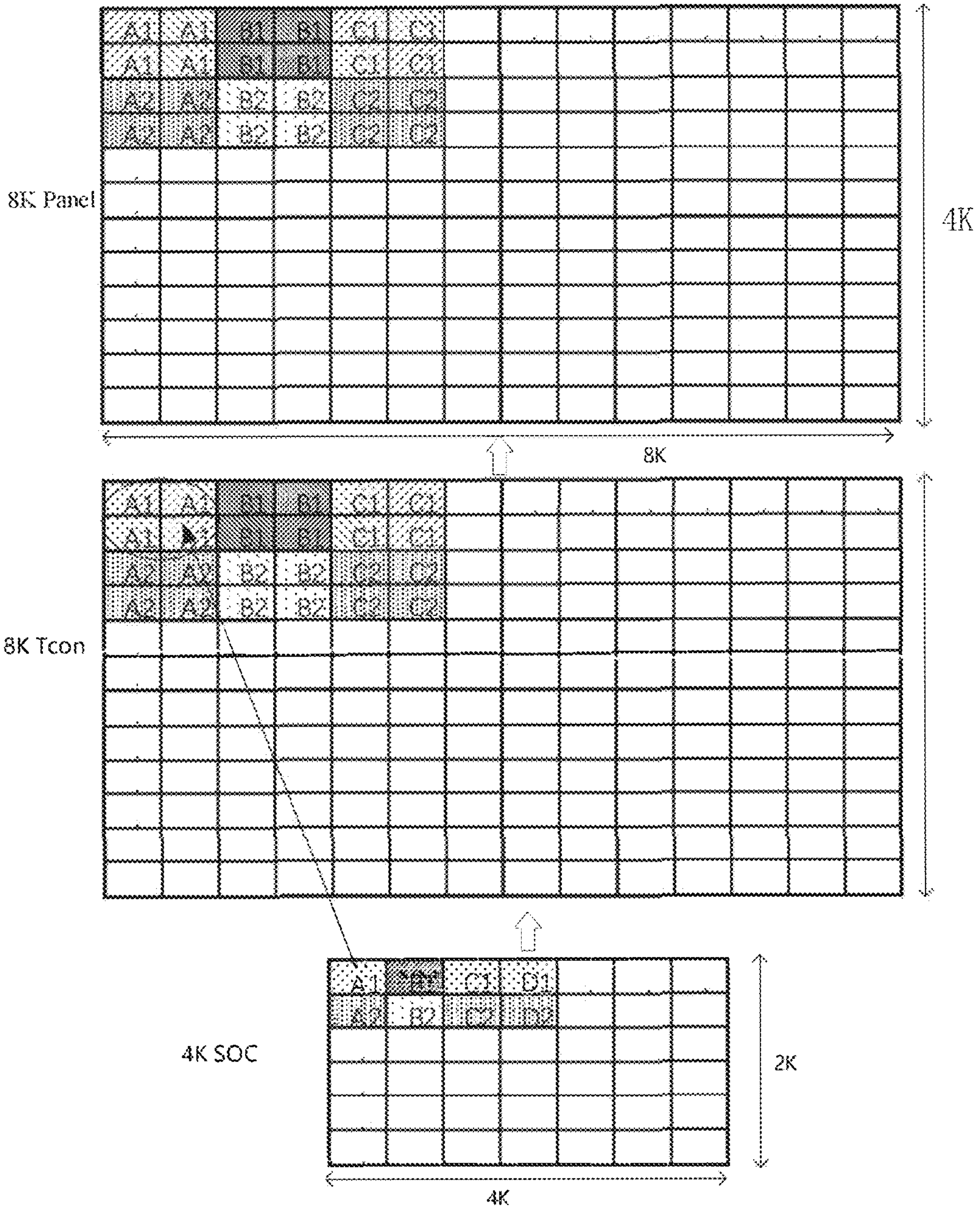
FIG. 11 is a schematic diagram of data display according to some embodiments of the present disclosure.

In the display device provided by other embodiments of the present disclosure, the resolution of the SOC chip can be ¼ of the resolution of the display panel Panel, and the resolution of the Tcon chip can be the same as the resolution of the display panel Panel. For example, the resolution of the SOC chip is 4 k, and the resolutions of the Tcon chip and the display panel Panel are both 8 k. At this time, the first control unit TG1 in the drive circuit S-IC in the display panel Panel can be controlled to be turned off, and the second control unit Unit TG2 in the drive circuit S-IC in the display panel Panel can be controlled to be turned on. In this way, the display panel Panel is in the normal display mode, data replication is no longer performed, and the high-resolution display panel Panel can also be driven. For example, FIG. 11 is a schematic diagram of data display according to some embodiments of the present disclosure. As shown in FIG. 11, this solution is with a 4K signal source input, and an 8K Tcon chip is used to drive an 8K display panel Panel. Although the physical resolution of the screen is 8K, the actual resolution is 4K because four adjacent pixels display the same data finally, and an 8 k display panel Panel can also be driven. However, considering the actual situation that the current cost of the 8K Tcon is more than five times of the cost of the 4K Tcon, there is a problem of excessive cost in this solution compared to the previous solution.

Other embodiments of the present disclosure will be readily apparent to those skilled in the art from consideration of the description and practice of the present disclosure. The present disclosure is intended to cover any variations, uses, or adaptations of the present disclosure that follow the general principles of the present disclosure and include common knowledge or conventional technical means in the art that are not disclosed in the present disclosure. It is intended that the description and embodiments should be considered as examples only, with a true scope and spirit of the present disclosure being indicated by the appended claims.

What is claimed is:

1. A display panel, comprising a drive circuit, wherein the drive circuit is at least used to drive the display panel to display obtained display data, and the drive circuit comprises:

a shift register, used to output display data of each sub-pixel according to a preset timing sequence;

a data buffer, at least comprising a first cache module, wherein the first cache module comprises N repeat units, and a repeat unit comprises at least one cache unit; the cache unit is connected to the shift register; two cache units at a same position in a k-th repeat unit and a (k+1)-th repeat unit are multiplexed with a same clock signal terminal; the cache unit is turned on in response to an output signal from the clock signal terminal connected to the cache unit, to cache received display data; N is a positive integer greater than or equal to 2; and k is an odd number;

a first control circuit, comprising a plurality of first control units, wherein a first control unit is connected between a clock signal terminal and a cache unit in the (k+1)-th repeat unit connected to the clock signal terminal; the first control unit is turned on when an enable signal terminal connected to the first control unit outputs a first control signal, to copy display data corresponding to a cache unit in the k-th repeat unit to a cache unit at a corresponding position in the (k+1)-th repeat unit; and a clock circuit, comprising a plurality of cascaded shift output units, wherein a shift output unit is provided with the clock signal terminal, and the shift output unit is used to output a clock signal through the clock signal terminal;

wherein, an output terminal of an (e×n)-th shift output unit is cascaded to an input terminal of an (e×n+1)-th shift output unit through a second transmission gate, and is cascaded to an input terminal of an (e×n+(e+1))-th shift output unit through a first transmission gate;

an output terminal of an (e×n+e)-th shift output unit is cascaded to the input terminal of the (e×n+ (e+1))-th shift output unit through another second transmission gate; and e is a number of sub-pixels comprised in the pixel unit in the display panel, n is an odd number, and a turn-on level of the second transmission gate has an opposite polarity to a turn-on level of the first transmission gate.

2. The display panel according to claim 1, wherein the cache unit in the (k+1)-th repeat unit is multiplexed with a clock signal terminal corresponding to the cache unit at a same position in the k-th repeat unit.

3. The display panel according to claim 1, wherein an input terminal of the shift register is connected to a data output terminal of a drive board, a data input terminal of the drive board is connected to a signal source terminal, and display data output from the signal source terminal is output to the shift register through the drive board;

wherein, a resolution of the display panel is four times of a resolution of the drive board and of a resolution of the signal source terminal.

4. The display panel according to claim 1, wherein a cache unit stores display data of a sub-pixel; and the display panel comprises a plurality of pixel units distributed in an array with a row direction and a column direction, a pixel unit comprises at least one sub-pixel, and a number of sub-pixels in the pixel unit is correspondingly the same as a number of cache units in the repeat unit.

5. The display panel according to claim 4, wherein the pixel unit comprises a first sub-pixel, a second sub-pixel and a third sub-pixel; the first sub-pixel, the second sub-pixel and the third sub-pixel are distributed alternately and sequentially along the row direction;

wherein, the repeat unit is in one to one correspondence with the pixel unit; and the repeat unit comprises a first cache unit, a second cache unit and a third cache unit;

the first cache unit is used to store display data corresponding to the first sub-pixel, the second cache unit is used to store display data corresponding to the second sub-pixel, and the third cache unit is used to store display data corresponding to the third sub-pixel; and a first control unit is connected in series between a first cache unit in the k-th repeat unit and a first cache unit in the (k+1)-th repeat unit; a first control unit is connected in series between a second cache unit in the k-th repeat unit and a second cache unit in the (k+1)-th repeat unit, and a first control unit is connected in series between a third cache unit in the k-th repeat unit and a second cache unit in the (k+1)-th repeat unit.

6. The display panel according to claim 1, wherein the cache unit comprises a plurality of cache sub-units, and a number of cache sub-units in a same cache unit is the same as a number of data bits comprised in display data of a sub-pixel.

7. The display panel according to claim 1, wherein the first control unit comprises:

a first transmission gate, connected to the enable signal terminal and two cache units at the same position in the k-th repeat unit and the (k+1)-th repeat unit; wherein the first transmission gate is used to transmit display data stored in the cache unit in the k-th repeat unit to a corresponding cache unit in the (k+1)-th repeat unit in response to the first control signal output from the enable signal terminal.

8. The display panel according to claim 1, wherein the drive circuit further comprises:

a second control circuit, comprising m second control units, wherein a second control unit is connected in series between the cache unit in the (k+1)-th repeat unit and the clock signal terminal corresponding to the cache unit in the (k+1)-th repeat unit; the second control unit is turned off when the enable signal terminal outputs the first control signal, or turned on when the enable signal terminal outputs a second control signal; and the first control signal has an opposite polarity to the second control signal.

9. The display panel according to claim 8, wherein the second control unit comprises:

a second transmission gate, connected to the cache unit in the (k+1)-th repeat unit and the clock signal terminal corresponding to the cache unit in the (k+1)-th repeat unit; wherein the second transmission gate is turned off in response to the first control signal output from the enable signal terminal, or turned on in response to the second control signal output from the enable signal terminal.

10. The display panel according to claim 1, wherein the data buffer further comprises:

a second cache module, wherein the second cache module comprises a plurality of storage units, a storage unit is connected to each cache unit in the first cache module in one to one correspondence, and the storage unit is used to output display data stored in the cache unit to a data line connected to the storage module.

11. A display panel, comprising:

a drive circuit, used to sequentially receive row data to be displayed, and apply received x-th row data to be displayed to a (2x−1)-th row of sub-pixels and a 2x-th row of sub-pixels respectively; and a gate drive circuit, used to control the (2x−1)-th row of sub-pixels to be charged for 1H and the 2x-th row of sub-pixels to be charged for 2H; wherein x is a natural number greater than or equal to 1 and less than N, and N is a total number of pixel rows in the display panel;

wherein the drive circuit comprises a clock circuit, the clock circuit comprises a plurality of cascaded shift output units, wherein a shift output unit is provided with the clock signal terminal, and the shift output unit is used to output a clock signal through the clock signal terminal;

wherein, an output terminal of an (e×n)-th shift output unit is cascaded to an input terminal of an (e×n+1)-th shift output unit through a second transmission gate, and is cascaded to an input terminal of an (e×n+(e+1))-th shift output unit through a first transmission gate;

an output terminal of an (e×n+e)-th shift output unit is cascaded to the input terminal of the (e×n+ (e+1))-th shift output unit through another second transmission gate; and e is a number of sub-pixels comprised in the pixel unit in the display panel, n is an odd number, and a turn-on level of the second transmission gate has an opposite polarity to a turn-on level of the first transmission gate.

12. A display panel, comprising:

a drive circuit, used to sequentially receive row data to be displayed, and apply received x-th row data to be displayed to a (2x−1)-th row of sub-pixels and a 2x-th row of sub-pixels respectively; and a gate drive circuit, used to control the (2x−1)-th row of sub-pixels and the 2x-th row of sub-pixels both to be charged for 2H; wherein x is a natural number greater than or equal to 1 and less than N, and N is a total number of pixel rows in the display panel;

wherein the drive circuit comprises a clock circuit, the clock circuit comprises a plurality of cascaded shift output units, wherein a shift output unit is provided with the clock signal terminal, and the shift output unit is used to output a clock signal through the clock signal terminal;

wherein, an output terminal of an (e×n)-th shift output unit is cascaded to an input terminal of an (e×n+1)-th shift output unit through a second transmission gate, and is cascaded to an input terminal of an (e×n+(e+1))-th shift output unit through a first transmission gate;

an output terminal of an (e×n+e)-th shift output unit is cascaded to the input terminal of the (e×n+ (e+1))-th shift output unit through another second transmission gate; and e is a number of sub-pixels comprised in the pixel unit in the display panel, n is an odd number, and a turn-on level of the second transmission gate has an opposite polarity to a turn-on level of the first transmission gate.

13. A driving method for a display panel, used to drive the display panel according to claim 1, and the driving method comprising:

obtaining the first control signal output from the enable signal terminal, wherein the first control signal is used to control the first control unit to be turned on;

obtaining the display data output from the signal source terminal, converting an obtained serial data signal into a parallel signal through the shift register, and then outputting the parallel signal; and obtaining a clock signal output from the clock signal terminal, and caching received display data through the cache unit in response to the clock signal output from the clock signal terminal connected to the cache unit; wherein the display data of the cache unit corresponding to the k-th repeat unit in the data buffer is copied to the cache unit at the corresponding position in the (k+1)-th repeat unit through the first control unit, and k is an odd number.

14. A driving method for a display panel, used to drive the display panel according to claim 11, and the driving method comprising:

receiving the row data to be displayed, sequentially; and applying the received x-th row data to be displayed to the (2x−1)-th row of sub-pixels and the 2x-th row of sub-pixels respectively; wherein a charging duration of the (2x−1)-th row of sub-pixels is 1H, and a charging duration of the 2x-th row of sub-pixels 1 is 2H;

wherein, x is a natural number greater than or equal to 1 and less than N, and N is a total number of pixel rows in the display panel.

15. A driving method for a display panel, used to drive the display panel according to claim 13, the driving method comprising:

receiving the row data to be displayed, sequentially; and applying the received x-th row data to be displayed to the (2x−1)-th row of sub-pixels and the 2x-th row of sub-pixels respectively; wherein a charging duration of the (2x−1)-th row of sub-pixels and a charging duration of the 2x-th row of sub-pixels are both 2H;

wherein, x is a natural number greater than or equal to 1 and less than N, and N is a total number of pixel rows in the display panel.

16. A display device, comprising:

the display panel according to claim 1;

a drive board, connected to the display panel; wherein the drive board comprises a Tcon chip, and the Tcon chip is used to output obtained display data to the display panel; and a signal source terminal, comprising an SOC chip; wherein the SOC chip is connected to the Tcon chip, and the SOC chip is used to output the display data to the Tcon chip.

17. The display device according to claim 16, wherein each of a resolution of the SOC chip and a resolution of the Tcon chip is ¼ of a resolution of the display panel.

18. The display device according to claim 16, wherein a resolution of the SOC chip is ¼ of a resolution of the display panel, and a resolution of the Tcon chip is the same as the resolution of the display panel.

19. The display device according to claim 16, wherein the cache unit in the (k+1)-th repeat unit is multiplexed with a clock signal terminal corresponding to the cache unit at a same position in the k-th repeat unit.

* * * * *